United States Patent
Lok et al.

(10) Patent No.: US 8,877,668 B2
(45) Date of Patent: *Nov. 4, 2014

(54) PROCESS TO REDUCE CATALYST FLUIDIZATION IN REGENERATION UNITS

(75) Inventors: Ka L. Lok, Buffalo Grove, IL (US); Mary Jo Wier, Schaumburg, IL (US); Pengfei Chen, Glenview, IL (US); Alexander V. Sabitov, Wilmette, IL (US)

(73) Assignee: UOP LLC, Des Plaines, IL (US)

( * ) Notice: Subject to any disclaimer, the term of this patent is extended or adjusted under 35 U.S.C. 154(b) by 203 days.

This patent is subject to a terminal disclaimer.

(21) Appl. No.: 13/489,656

(22) Filed: Jun. 6, 2012

(65) Prior Publication Data

US 2013/0005562 A1 Jan. 3, 2013

Related U.S. Application Data

(60) Provisional application No. 61/502,940, filed on Jun. 30, 2011.

(51) Int. Cl.
*B01J 8/02* (2006.01)

(52) U.S. Cl.
CPC .......... *G01J 8/02* (2013.01); *B01J 2208/00548* (2013.01); *B01J 8/0292* (2013.01); *Y10S 502/514* (2013.01)
USPC ........................................... 502/56; 502/514

(58) Field of Classification Search
CPC ........................................................ B01J 20/34
USPC ................................................... 502/56, 514
See application file for complete search history.

(56) References Cited

U.S. PATENT DOCUMENTS

| | | |
|---|---|---|
| 4,118,337 A | 10/1978 | Gross et al. |
| 4,471,063 A | 9/1984 | Hettinger |
| 4,662,081 A | 5/1987 | Greenwood |
| 5,151,392 A | 9/1992 | Fettis et al. |
| 5,156,817 A | 10/1992 | Luckenbach |
| 6,117,809 A | 9/2000 | Sechrist et al. |
| 6,881,391 B1 | 4/2005 | Sechrist |
| 6,884,400 B1 * | 4/2005 | Austin et al. .................. 422/216 |
| 7,758,820 B2 | 7/2010 | Mehlberg et al. |
| 7,799,287 B2 | 9/2010 | Hedrick et al. |
| 8,544,527 B2 * | 10/2013 | Lok et al. .......................... 165/4 |
| 2007/0060782 A1 | 3/2007 | Ablin |
| 2009/0110615 A1 | 4/2009 | Vetter et al. |
| 2010/0075829 A1 | 3/2010 | Lambin et al. |
| 2010/0175553 A1 | 7/2010 | Andreux et al. |
| 2011/0319691 A1 | 12/2011 | Sun et al. |
| 2013/0004377 A1 | 1/2013 | Lok et al. |
| 2014/0004017 A1 * | 1/2014 | Lok et al. ...................... 422/201 |

FOREIGN PATENT DOCUMENTS

WO 2007076317 A1 7/2007

\* cited by examiner

*Primary Examiner* — Edward Johnson
(74) *Attorney, Agent, or Firm* — Mark Goldberg

(57) ABSTRACT

The invention involves a process that reduces the potential for catalyst fluidization in a reduction vessel of a continuous catalyst regeneration system. The gas exit area from the catalyst reduction zone is increased by ventilating the cylindrical baffle of the upper reduction zone. This provides an increased exit cross-sectional area for the upper reduction gas to escape and reduce the overall exit velocity of the combined upper and lower reduction gases and reduces the potential for catalyst fluidization.

9 Claims, No Drawings

PROCESS TO REDUCE CATALYST FLUIDIZATION IN REGENERATION UNITS

CROSS-REFERENCE TO RELATED APPLICATION

This application claims priority from Provisional Application No. 61/502,940 filed Jun. 30, 2011, the contents of which are hereby incorporated by reference.

BACKGROUND OF THE INVENTION

This invention relates to a process to reduce catalyst fluidization in catalyst regeneration units. More particularly, this invention relates to the use of ventilated annular baffles to lower the gas velocity of gases exiting continuing catalyst regeneration units (CCR).

Although catalysts for the conversion of hydrocarbons have a tendency to deactivate, usually a catalyst's activity may be restored by one of a number of processes that are known generally as regeneration processes. Regeneration processes are extensively used. The specific steps that comprise a regeneration process depend in part on the reason for the deactivation. For example, if the catalyst contains a catalytic metal such as platinum, regeneration usually includes oxidizing the metal by contacting the catalyst with oxygen. In an oxidized state, however, the catalyst metal is generally not in its most active form for promoting hydrocarbon conversion reactions. Consequently, regeneration often also includes reducing the oxidized metal by contacting the catalyst with hydrogen. Operating conditions and methods for such catalyst reduction steps are well known. Regeneration processes that include a catalyst reduction step can be carried out in situ, or the catalyst may be withdrawn from the vessel in which the hydrocarbon conversion takes place and transported to a separate regeneration zone for reactivation. Arrangements for continuously or semi continuously withdrawing catalyst particles from a reaction zone and for reactivation in a regeneration zone are well known. In one type of regeneration system, there are both upper and lower reduction zones where the upper reduction gases and lower reduction gases combine to exit the catalyst bed between an upper cylindrical baffle and the shell of the reduction zone vessel. It has been found that the gas velocity of the combined reduction gas flow can be too high which can result in catalyst attrition and clogging of vent gas lines.

SUMMARY OF THE INVENTION

It has been found that modification of the bottom portion of the annular baffle that defines the upper reduction zone can provide a solution to the above described problems. More specifically, the addition of about a 6 to 25 cm ventilated screen or a perforated plate to the bottom of the annular baffle sufficiently solves the problem of excessive gas velocity of the combined reduction gas flow and excessive attrition.

The reactor of the present invention has a reduction zone comprising an upper zone and a lower zone wherein the upper zone comprises an annular shaped baffle and an annular shaped opening and wherein a portion of said annular shaped baffle adjacent to the opening is a ventilated section. The portion of the annular shaped baffle may comprise a screen.

In another embodiment, the invention involves a device for discharging a catalyst containing stream from a continuing catalyst regeneration unit comprising an annular shaped baffle having an upper portion to retain catalyst particles and a lower portion having openings. The lower portion typically comprises a perforated plate or a screen. In a typical embodiment, from 25 to 95% of the lower portion comprises the openings.

In yet another embodiment, the invention involves an apparatus to increase a flow of gas exiting a reaction vessel comprising a cylindrical shaped reactor wherein within the cylindrical shaped reactor is positioned at least one annular baffle wherein a portion of a surface of the annular baffle comprises a screen. In this apparatus about 25 to 50 percent of the flow of gas exits the reaction vessel through the screen. Preferably, about 33% of the flow of gas exits the reaction vessel through the screen. The screen may be above an opening through which a majority of said gas passes.

The process of the invention involves the regeneration of a catalyst in which the catalyst is heated catalyst within a cylindrically shaped reactor having an annular shaped baffle in an upper portion of said reactor and an opening adjacent to the annular shaped baffle for discharge of a portion of a regenerated catalyst stream and openings within the baffle for discharge of a second portion of said regenerated catalyst stream.

DETAILED DESCRIPTION OF THE INVENTION

The invention involves the use of a vessel for use in reduction of oxidized catalyst to produce a reduced catalyst. This vessel is generally cylindrical in shape, having a nominal length-to-diameter ratio in the range from about 0.5 to 20 and preferably from 0.5 to 10. In its upright operating position, the vessel has an upper end and a lower end with an upper reduction zone within the upper end and a lower reduction zone within the lower end. The inside of the vessel is defined as an annular shape that varies in diameter. Oxidized catalyst is introduced into the upper end of the regeneration vessel. A reducing gas that is rich in hydrogen is introduced into both the upper and the lower reduction zones. This reducing gas is heated to operating temperatures prior to being introduced. A portion of the reducing gas is removed from the regeneration vessel through a reduction vent gas line. It has been found that this reduction vent gas line may be clogged up by catalyst particles. Such particles are produced through attrition of catalyst. In particular, attrition can be the result of due to catalyst fluidization in the reduction zone. An excessive gas exit velocity has been found to result in an increase in catalyst attrition.

In the present invention, it has been found advantageous to ventilate the bottom section of the annular baffle of the upper reduction zone by replacing a section of solid baffle with a material having openings, such as a profile wire screen or a perforated plate. This ventilated area allows the upper reduction gas to escape and reduces the exit velocity of the combined upper and lower reduction gases from the catalyst bed and thereby reduce the potential for fluidizing the catalyst.

The benefit of this invention is to provide between a 25 and 50% increase in surface area for gas to escape, depending upon the dimensions of the ventilated screen chosen, both in the total surface area of the ventilated screen and the ratio of openings to screen material. This increase can be about 50% in surface area for a small catalyst regeneration unit (750 lb/hr, 340 kg/hr) and about 25% for a large regeneration unit (4500 lb/hr, 2041 kg/hr). Since the overall length of the upper baffle does not need to change from the original design, there is no change to the catalyst flow regime for good even catalyst flow. However, while there is some loss in heat transfer efficiency between the hot upper reduction gas and the cold catalyst, this transfer is expected to be small and can be easily compensated for by adjustments in heating the reduction gases. There also is no need for modifications to the design of the reduction zone shell or addition of any extension to the reduction zone. These features make it feasible to revamp a catalyst reduction unit to resolve issues involving frequent catalyst fluidization. The following comparison table illustrates the increase in percentage of cross-sectional area for various regeneration unit sizes ranging from 340 kg/hr (750 lb/hr) to 2041 kg/hr (4500 lb/hr). A further advantage of the use of the screen material is that this is a low cost solution to a significant problem.

TABLE

| | Case A | | | | Case B Ventilated Design | | | |
|---|---|---|---|---|---|---|---|---|
| | Original Design | | | | | | Added | Increase |
| CCR Rate kg/hr | Reduction Zone Vessel ID, meter | Upper Cylindrical Baffle ID (D), meter | Upper Cylindrical Baffle Length (L), meter | Available Vapor Escape X-section area, m² | Profile Wire Screen Length, meter | Profile Wire Screen Length, inch | Surface Area for Vapor to Escape, m² | in % of Surface Area for Gas to Escape, % |
| 340 | 0.975 | 0.700 | 0.700 | 0.362 | 0.082 | 3.2 | 0.180 | 50% |
| 680 | 1.325 | 0.875 | 0.875 | 0.778 | 0.141 | 5.6 | 0.388 | 50% |
| 907 | 1.450 | 0.875 | 0.875 | 0.050 | 0.170 | 6.7 | 0.467 | 45% |
| 2041 | 1.950 | 0.950 | 0.950 | 2.278 | 0.190 | 7.5 | 0.567 | 25% |

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for regenerating a catalyst comprising heating said catalyst within a cylindrically shaped reactor having an annular shaped baffle in an upper portion of said reactor and an opening adjacent to said annular shaped baffle for discharge of a portion of a regenerated catalyst stream and openings within said baffle for discharge of a second portion of said regenerated catalyst stream.

2. The process of claim 1 wherein a portion of said annular shaped baffle adjacent to said opening is a ventilated section.

3. The process of claim 1 wherein said openings within said annular shaped baffle are within a screen or a perforated plate.

4. The process of claim 1 wherein said portion of said annular shaped baffle comprises a screen.

5. The process of claim 1 wherein said ventilated section is annular in configuration and wherein said ventilated section is from 6 to 25 cm in length measured in a longitudinal direction along said reactor.

6. The process of claim 1 wherein a flow of gas exits said cylindrically shaped reactor through a portion of said annular shaped baffle that comprises a screen.

7. The process of claim 6 wherein about 25 to 50 percent of said flow of gas exits said cylindrically shaped reactor through said screen.

8. The process of claim 6 wherein about 33% of said flow of gas exits said reaction vessel through said screen.

9. The process of claim 4 wherein said screen is above an opening through which a majority of said gas passes.

* * * * *